(12) United States Patent
Benzing, II et al.

(10) Patent No.: US 8,141,606 B2
(45) Date of Patent: *Mar. 27, 2012

(54) TIRE

(75) Inventors: James Alfred Benzing, II, North Canton, OH (US); James Christopher Kish, Akron, OH (US); Vivake Manohar Asnani, North Olmsted, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 154 days.

This patent is subject to a terminal disclaimer.

(21) Appl. No.: 12/616,952

(22) Filed: Nov. 12, 2009

(65) Prior Publication Data
US 2010/0300587 A1  Dec. 2, 2010

Related U.S. Application Data

(60) Provisional application No. 61/182,244, filed on May 29, 2009.

(51) Int. Cl.
*B60B 9/06* (2006.01)

(52) U.S. Cl. ............ 152/250; 152/5; 152/13; 152/95; 152/251

(58) Field of Classification Search .......... 152/5, 11, 152/12, 13, 80, 87, 94, 95, 196, 197, 198, 152/202, 246, 247, 250, 251, 252, 261, 526, 152/530, 535, 563; 301/5, 13.1, 13.2, 95.11
See application file for complete search history.

(56) References Cited

U.S. PATENT DOCUMENTS

| | | | | |
|---|---|---|---|---|
| 562,811 A * | 6/1896 | Elder | | 152/250 |
| 591,922 A | 10/1897 | Kadel | | |
| 677,378 A * | 7/1901 | Stone | | 152/250 |
| 729,385 A * | 5/1903 | Morrison | | 152/405 |
| 762,740 A * | 6/1904 | Midgley | | 152/198 |
| 798,225 A * | 8/1905 | Sterling | | 152/156 |
| 877,726 A * | 1/1908 | Nordlund | | 152/413 |
| 942,097 A * | 12/1909 | Norcross | | 152/261 |
| 976,710 A | 11/1910 | Treier | | |
| 1,013,656 A | 1/1912 | Hester | | |
| 1,015,036 A * | 1/1912 | Lare | | 152/281 |
| 1,038,144 A * | 9/1912 | Hutchinson | | 152/400 |
| 1,039,427 A * | 9/1912 | McCarty | | 152/250 |
| 1,074,787 A * | 10/1913 | Godley | | 152/11 |
| 1,086,947 A | 2/1914 | Smith | | |
| 1,090,996 A | 3/1914 | Leonard | | |
| 1,092,029 A | 3/1914 | Dodge | | |
| 1,102,423 A | 7/1914 | McMillan | | |
| 1,133,153 A * | 3/1915 | Jones | | 152/202 |
| 1,195,148 A | 8/1916 | Newman | | |
| 1,200,864 A | 10/1916 | Oberholtzer et al. | | |
| 1,217,190 A | 2/1917 | Jutila | | |
| 1,217,385 A | 2/1917 | Ankeny | | |

(Continued)

FOREIGN PATENT DOCUMENTS

CN  101177104 A  5/2008

(Continued)

*Primary Examiner* — Kip T Kotter
(74) *Attorney, Agent, or Firm* — Robert N. Lipcsik

(57) ABSTRACT

A tire includes a plurality of helical springs. Each helical spring includes a first end portion, a second end portion, and an arching middle portion. Each helical spring is interlaced with at least one other helical spring thereby forming a laced toroidal structure extending about an entire circumference of the tire.

15 Claims, 6 Drawing Sheets

U.S. PATENT DOCUMENTS

| | | | |
|---|---|---|---|
| 1,345,827 A | 7/1920 | Bohannon | |
| 1,349,339 A | 8/1920 | Horne | |
| 1,383,829 A | 7/1921 | Leathers | |
| 1,457,538 A | 6/1923 | Mark et al. | |
| 1,472,913 A * | 11/1923 | Jones | 152/202 |
| 1,561,759 A * | 11/1925 | Wetmore | 152/202 |
| 1,874,396 A | 8/1932 | Weaver | |
| 1,890,442 A | 12/1932 | Altuna | |
| 2,059,764 A * | 11/1936 | Zerillo | 152/202 |
| 2,941,565 A | 6/1960 | Rusch et al. | 152/158 |
| 3,089,530 A * | 5/1963 | Kocher | 152/288 |
| 3,449,199 A * | 6/1969 | Mead | 428/105 |
| 3,568,748 A | 3/1971 | Paine et al. | 152/250 |
| 3,773,388 A | 11/1973 | Gorzell | 301/5 R |
| 3,789,947 A | 2/1974 | Blumrich | 180/79.3 |
| 3,802,743 A | 4/1974 | Hermanns | 301/5 R |
| 3,982,576 A | 9/1976 | Replin | 152/155 |
| 4,153,094 A | 5/1979 | McKenzie | 152/334 |
| 4,211,268 A | 7/1980 | Ravnikar | 152/5 |
| 4,579,160 A | 4/1986 | Hardingham | 152/158 |
| 4,782,875 A | 11/1988 | Jones | 152/80 |
| 4,917,162 A | 4/1990 | De Longcamp | 152/5 |
| 4,964,451 A * | 10/1990 | Schmidt | 152/202 |
| 5,125,443 A | 6/1992 | Schwartzman | 152/84 |
| 5,139,066 A | 8/1992 | Jarman | 152/7 |
| 5,253,849 A | 10/1993 | Kamada | 267/36.1 |
| 5,490,550 A | 2/1996 | Massie, II et al. | 152/193 |
| 5,556,488 A | 9/1996 | Gergele et al. | 152/198 |
| 6,170,544 B1 | 1/2001 | Hottebart | 152/11 |
| 6,648,039 B1 | 11/2003 | Bina | 152/156 |
| 6,769,465 B2 | 8/2004 | Rhyne et al. | 152/197 |
| 6,913,050 B2 | 7/2005 | Kimura | 152/13 |
| 7,011,127 B2 | 3/2006 | Maruoka | 152/543 |
| 7,201,194 B2 | 4/2007 | Rhyne et al. | 152/5 |
| 7,418,988 B2 | 9/2008 | Cron et al. | 152/5 |
| 7,546,862 B2 | 6/2009 | Moon et al. | 152/276 |
| 2007/0267116 A1 | 11/2007 | Rhyne et al. | 152/246 |
| 2008/0073014 A1 | 3/2008 | Abe | 152/378 R |

FOREIGN PATENT DOCUMENTS

| | | |
|---|---|---|
| EP | 1958793 A1 | 8/2008 |
| FR | 25298 | 5/1911 |
| GB | 19768 | 8/1914 |
| GB | 24251 | 11/1915 |
| GB | 261226 | 11/1926 |
| GB | 2059887 A | 9/1980 |
| GB | 2109752 A | 6/1983 |
| GB | 2285777 A | 7/1995 |
| GB | 2431383 A | 4/2007 |
| WO | 99/64256 | 12/1999 |
| WO | 2008/065407 A1 | 6/2008 |
| WO | 2008/071873 A1 | 6/2008 |

* cited by examiner

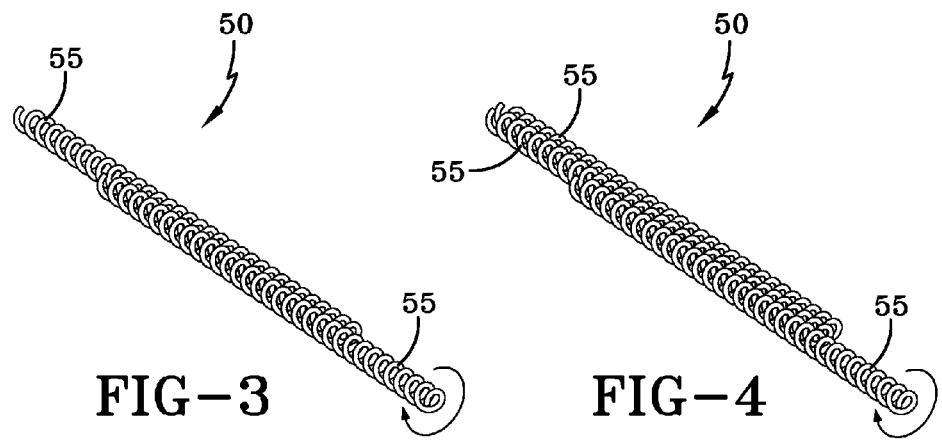
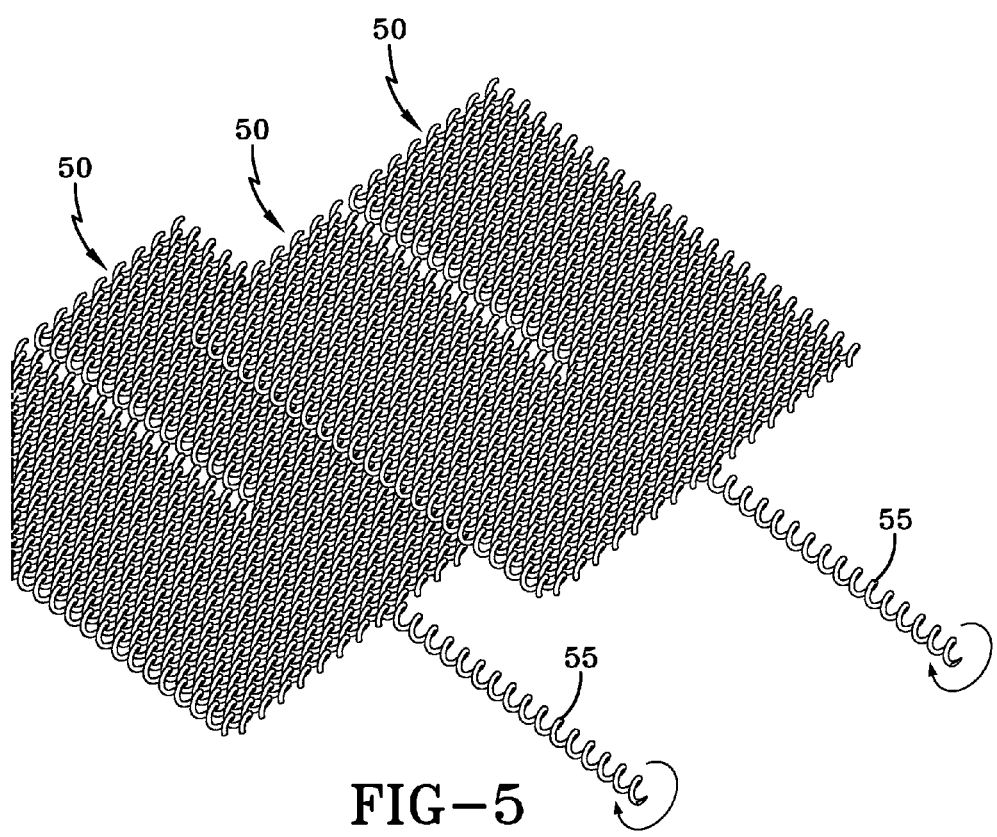

TIRE

CROSS REFERENCE TO OTHER APPLICATIONS

This application claims the benefit of and incorporates by reference U.S. Provisional Application No. 61/182,244 filed May 29, 2009.

STATEMENT REGARDING FEDERALLY SPONSORED RESEARCH

The invention described herein was made in the performance of work under NASA Contract No. NNX07AO16A and is subject to the provisions of Section 305 of the National Aeronautics and Space Act of 1958 (42 U.S.C. 2457).

FIELD OF INVENTION

The present invention relates to a tire.

BACKGROUND OF THE PRESENT INVENTION

The National Aeronautics and Space Administration (NASA) was developing new surface vehicles to support long range lunar exploration and the development of a lunar outpost. These vehicles will be heavier and will travel greater distances than the Lunar Roving Vehicle (LRV) developed for the Apollo program in the late 1960s. Consequently, new tires will be required to support up to ten times the weight and last for up to one hundred times the travel distance as compared to those used on the Apollo LRV, thereby requiring operational characteristics similar to passenger vehicles used on earth. However, conventional rubber pneumatic tires cannot function acceptably on the moon.

For example, rubber properties vary significantly between the cold temperatures experienced in shadow (down to 40 K) and the hot temperatures in sunlight (up to 400 K). Further, rubber degrades when exposed to direct solar radiation, without atmospheric protection. Finally, an air-filled tire is not permissible for manned lunar vehicles because of the possibility of a flat tire. To overcome these limitations, a tire design was developed for the Apollo LRV and was successfully used on Apollo missions 15, 16, and 17. This tire was woven from music wire, which was robust to lunar temperature variations and solar radiation, operated in vacuum, and did not require air for load support. This structure further functioned to contour to the lunar terrain, which facilitated traction and reduced vibration transfer to the Apollo LRV.

Because of the new weight and distance requirements for lunar vehicles, a tire with greater strength and durability would be desirable.

One conventional wheel and non-pneumatic tire assembly has a variable diameter which, in addition to changing its diameter, may also change its width, thereby increasing the area of the wheel that engages the ground. Thus, this non-pneumatic tire may be adjusted to increase a vehicle's performance according to the terrain over which it is traveling. This tire has arching members with first and second ends connecting a wheel hub. The arching members extend outwardly in an arc between the first and second ends. The arching members form a plurality of flexible hoops spaced circumferentially around the hub and extending radially outward from the hub.

More specifically, the conventional non-pneumatic tire forms a cage composed of thirty-eight equally spaced radially extending hoops that arch between axially outer rims of a hub. The hoops are made of helical steel springs filled by wires cut to a desired length and threaded through the center of the springs. The conventional hub may be expanded/contracted axially for varying the diameter of the tire.

The original wire mesh design of the Apollo LRV tire was found to not be readily scaleable. Specifically, the increase in wire diameter to create a tire that supported ten times the load of the original design created two significant limitations: 1) the ability to contour to the terrain was lost, thus limiting traction and ability to isolate vibration; and 2) the increased wire stresses limited functional life. A tire in accordance with the present invention overcomes these limitations, making the tire an innovative technological advance for Moon, Earth, and other planetary surfaces.

SUMMARY OF THE INVENTION

A tire in accordance with the present invention includes a plurality of helical springs. Each helical spring includes a first end portion, a second end portion, and an arching middle portion interconnecting the first end portion and the second end portion. Each helical spring is interlaced with at least one other helical spring of the plurality thereby forming a laced toroidal structure extending about an entire circumference of the tire.

According to another aspect of the present invention, a subset of helical springs are secured to a first annular rim of a wheel and/or a second annular rim of the wheel.

According to yet another aspect of the present invention, a wheel with an annular rim at each axial side of the tire secures the tire to the wheel.

According to still another aspect of the present invention, the laced toroidal structure defines a first ply for the tire.

According to yet another aspect of the present invention, a second ply radially overlaps the first ply.

According to still another aspect of the present invention, the second ply comprises a laced toroidal structure having a plurality of helical springs.

According to yet another aspect of the present invention, each helical spring of the second ply includes a first end portion, a second end portion, and an arching middle portion. Each helical spring of the second ply is interlaced with at least one other helical spring of the second ply thereby forming a laced toroidal structure extending about an entire circumference of the tire.

Another tire in accordance with the present invention includes a plurality of springs. Each spring includes a first end portion, a second end portion opposite the first end portion, and an arching middle portion interconnecting the first end portion and the second end portion. Each spring extends radially outward from the first end portion to the middle portion and radially inward from the middle portion to the second end portion. Each spring is interlaced with an adjacent spring on a first side of the spring and further is interlaced with an adjacent spring on a second opposite side of the spring thereby forming a toroidal structure extending about an entire circumference of the tire.

According to another aspect of the present invention, the first end portion of each spring is secured to a first annular rim of a wheel and the second end portion of each spring is secured to a second annular rim of the wheel.

According to still another aspect of the present invention, each spring forms an arch extending radially outward from a wheel.

According to yet another aspect of the present invention, a wheel with an annular rim at each axial side of the tire secures the springs to the wheel.

According to still another aspect of the present invention, the toroidal structure defines a first ply for the tire.

According to yet another aspect of the present invention, a second ply radially overlaps the first ply.

According to still another aspect of the present invention, the second ply includes a toroidal structure having a plurality of springs.

According to yet another aspect of the present invention, each spring of the second ply includes a first end portion, a second end portion opposite the first end portion, and an arching middle portion interconnecting the first end portion and the second end portion. Each spring of the second ply extends radially outward from the first end portion to the middle portion and radially inward from the middle portion to the second end portion. Each spring is interlaced with an adjacent spring on a first side of the spring and further is interlaced with an adjacent spring on a second opposite side of the spring thereby forming a toroidal structure extending about an entire circumference of the tire.

BRIEF DESCRIPTION OF THE DRAWINGS

FIG. 3 represents an intermediate step in forming the sheet of FIG. 2.

FIG. 4 represents another intermediate step in forming the sheet of FIG. 2.

FIG. 5 represents a step in securing two sheets, such as the sheets of FIG. 2, together.

DESCRIPTION OF AN EXAMPLE EMBODIMENT

Figure 1:
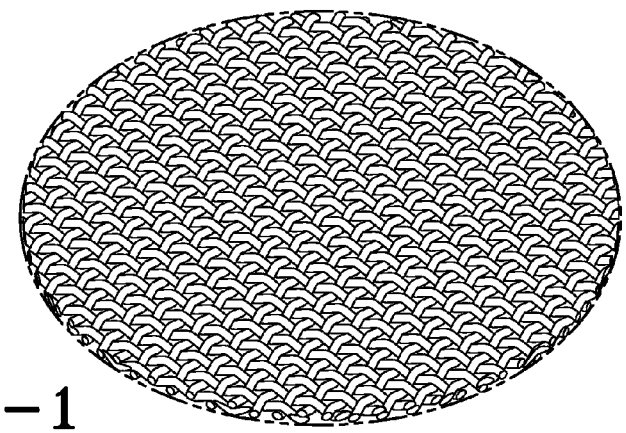
FIG. 1 represents a schematic illustration of a conventional wire mesh sheet.

The tire may include an interlaced plurality of helical springs (i.e., coiled wires which deform elastically under load with little energy loss). The tire defines a toroidal shaped structure for mounting to a wheel. The tire may contour to a surface on which the tire engages to facilitate traction while mitigating vibration transmission to a corresponding vehicle. The helical springs support and/or distribute a load of the vehicle. The tire may be pneumatic or non-pneumatic.

Under the weight of the vehicle, the tire may be driven, towed, or provide steering to the vehicle. The helical springs of the tire may passively contour to any terrain by flexing and moving with respect to each other. The interlaced structure of the helical springs provides stability to the tire and prevents the structure from collapsing as the tire rotates and engages variably terrain.

The helical springs of the tire may be resilient through a finite range of deformation, and thus a relatively rigid frame may be used to prevent excessive deformation.

Radially oriented springs may be used to connect the tire to the wheel. These springs may be interlaced. Other springs may be incorporated with the tire at any bias angle, from radial to circumferential, with the purpose of distributing load. These other springs may be helical springs. Further, as one example, these other springs may extend circumferentially around the tire at a radially outer portion of the tire.

External covering of some kind (i.e., a tread) may be added to protect the helical springs from impact damage and/or to change the tire's ability to float and generate traction.

As one example, four basic steps may be utilized to manufacture one example tire: i) twisting helical springs together to form a rectangular sheet with a length corresponding to the desired tire circumference; ii) interlacing ends of the rectangular sheet of springs to form a mesh cylinder; iii) collapsing one end of the mesh cylinder and attaching it to a rim of a wheel; and iv) flipping the other end of the mesh cylinder inside out and attaching it to another axially opposite rim of the wheel.

A tire in accordance with the present invention may be utilized on Earth, the Moon, Mars, and/or any other planetary body, since its elements operate reliably in atmospheric and terrain conditions of these planets.

The tire may be utilized on its own, or incorporated as a partial or auxiliary load support/distribution system within another tire type. The tire, however, requires no air, requires no rubber, operates in difficult environments, and contours to all terrains.

The tire provides an improvement over the conventional wire mesh tire of the Apollo LRV. The tire provides higher load capacity, since wire size of the helical springs may be increased with relatively little functional alteration. The tire provides a longer cycle life, since wire stresses of the helical springs are more uniformly distributed throughout the structure. Further, the tire provides relatively low weight per unit of vehicle weight supported, since the interlaced helical spring network is fundamentally stronger than the crimped wire mesh. Additionally, the tire provides improved manufacturability, since the helical springs may be screwed into one another, rather than woven together. Furthermore, helical springs are able to compress and elongate to accommodate manufacturing variations. Finally, the tire provides improved design versatility, since load distribution springs may be added to vary the tire strength in different tire locations and directions.

The tire can provide relatively low energy loss compared to tires that use frictional or hysteric materials in the carcass, since the helical springs consume near zero energy during deformation.

The tire contains redundant load carrying elements and can operate normally even after significant damage.

A tire in accordance with the present invention may thus be utilized where low vehicle energy consumption is required, where tire failure poses a critical threat, for traveling through rough terrain, where the vehicle is exposed to extreme temperatures or high levels of radiation, and/or where the vehicle is exposed to gun fire or bomb blasts.

Figure 2:
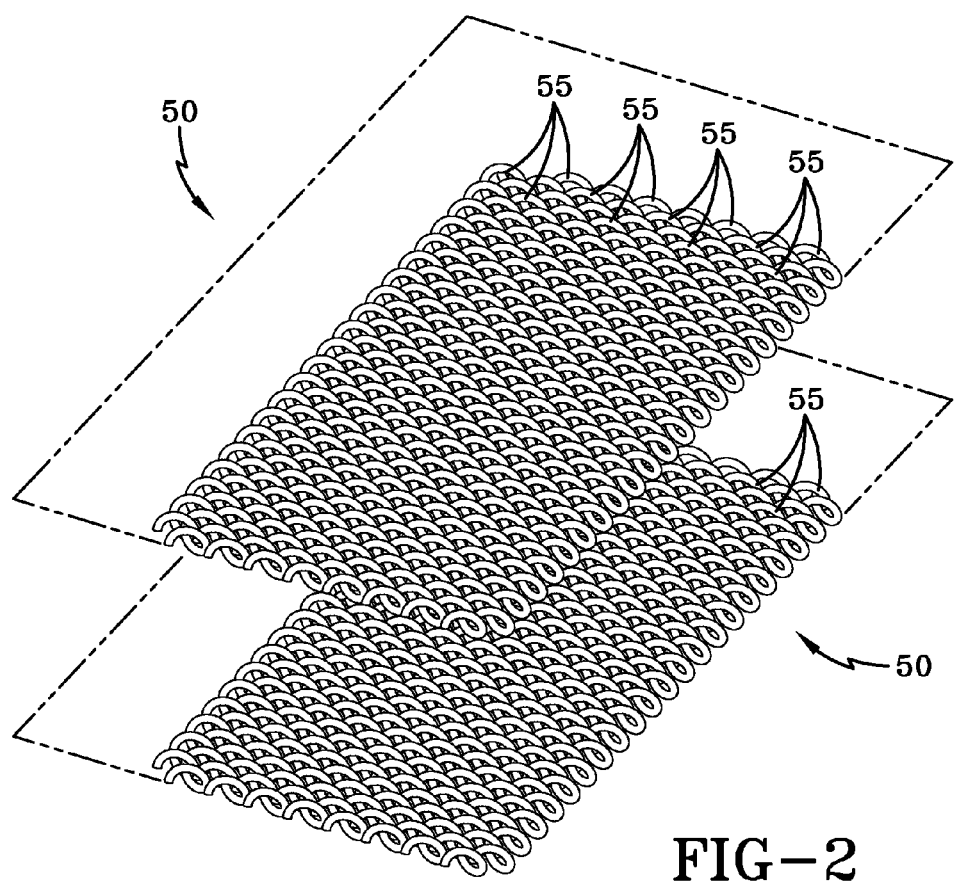
FIG. 2 represents two sheets of interlaced helical springs for use with the present invention.
Figure 6:
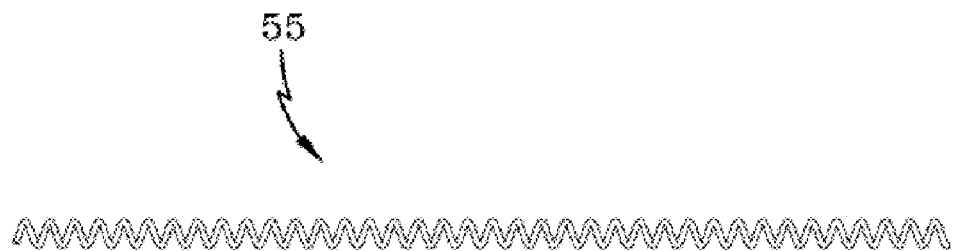
FIG. 6 represents a helical spring for use with the present invention.
Figure 7:
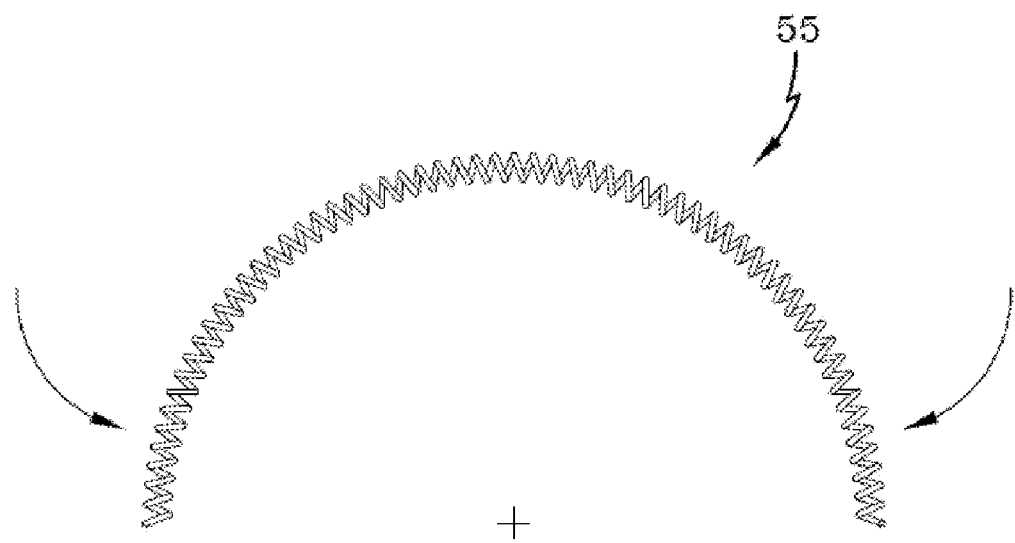
FIG. 7 represents the helical spring of FIG. 6 in a deflected condition.

As shown in FIG. 1, a woven wire mesh has been used for a conventional lunar tire. However, as discussed above, greater strength and durability is desired. FIG. 2 shows a mesh sheet 50 of interlaced helical springs 55 that may provide greater strength and durability than the wire mesh. FIGS. 3, 4, and 5 show intermediate steps in forming the mesh sheets 50, or plies, as shown in FIG. 2. In FIG. 3, a first helical spring 55 is shown being rotated thereby interlacing that same first spring with a second helical spring 55. In FIG. 4, a third helical spring 55 is shown being rotated thereby interlacing that third spring with the already woven first and second springs 55. In FIG. 5, two helical springs 55 are shown being rotated for connecting each of two mesh sheets 50, or plies, (i.e., the sheets of FIG. 2) of helical springs 55. FIG. 6 shows a single helical spring 55 for use as described above in FIGS. 2-5. FIG. 7 shows a single helical spring 55 deflected for use in a tire, as described below.

Figure 8:
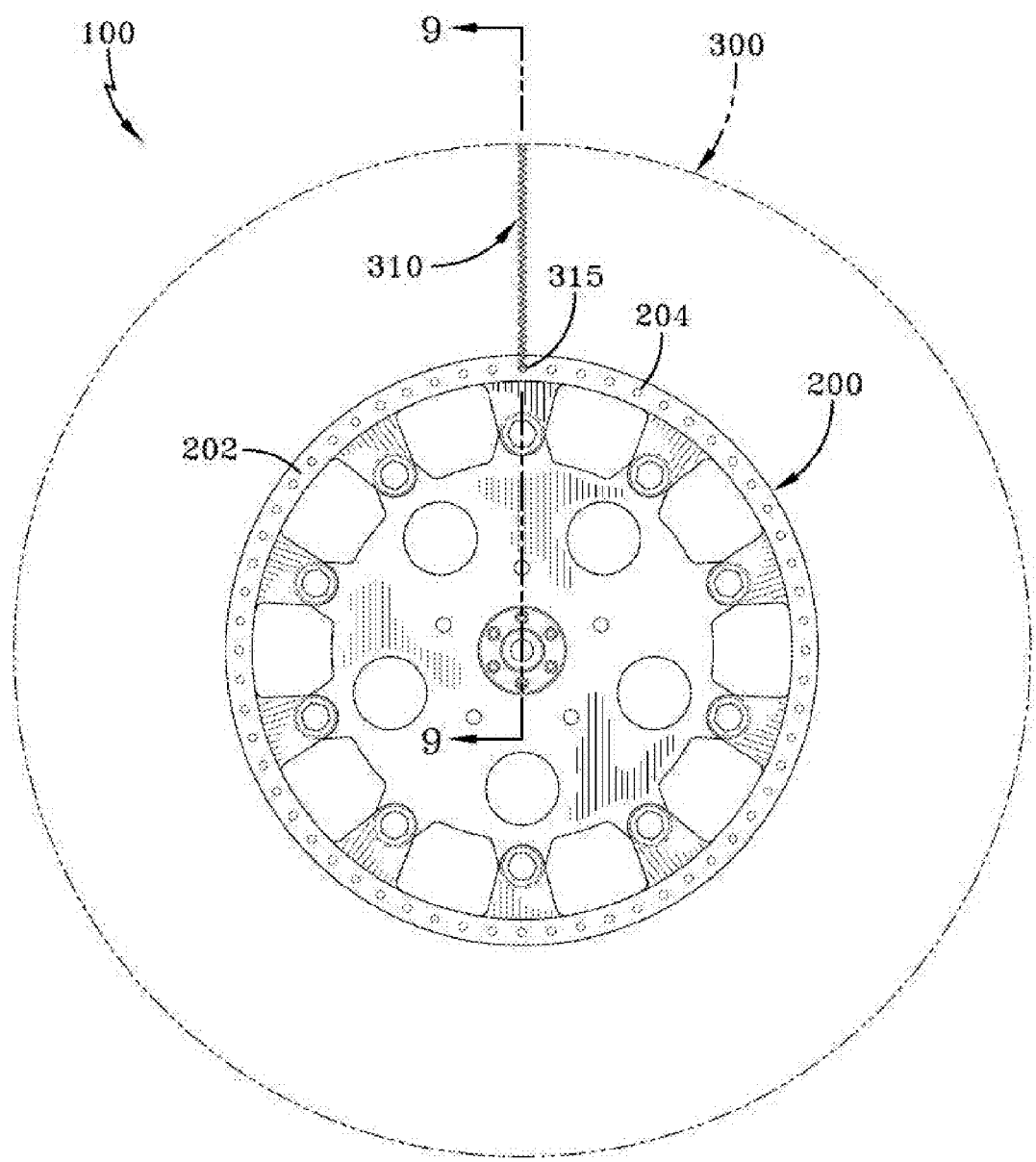
FIG. 8 represents a schematic illustration of a tire and wheel assembly in accordance with the present invention.
Figure 9:
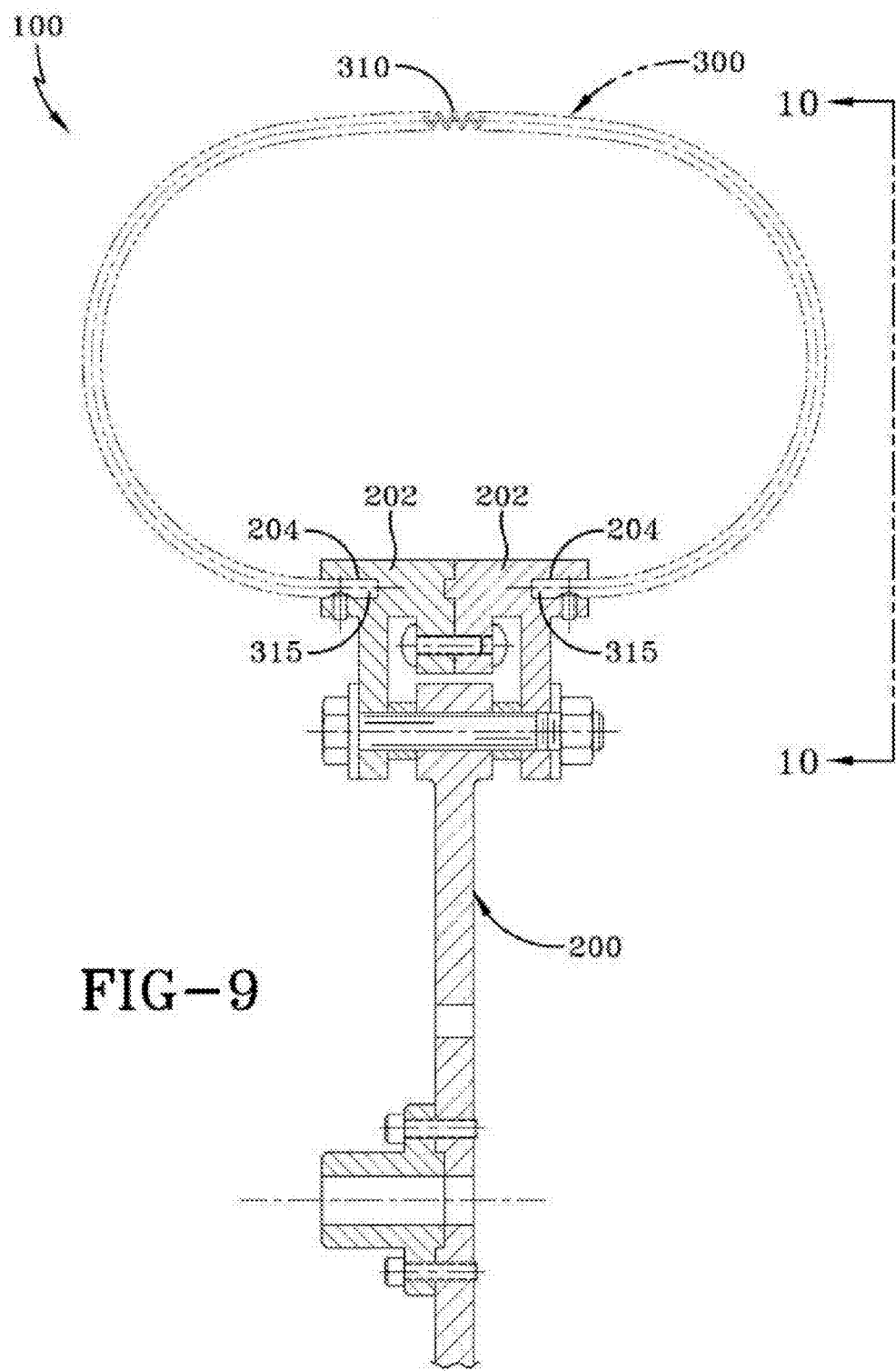
FIG. 9 represents a section taken through line 9-9 in FIG. 8.
Figure 10:
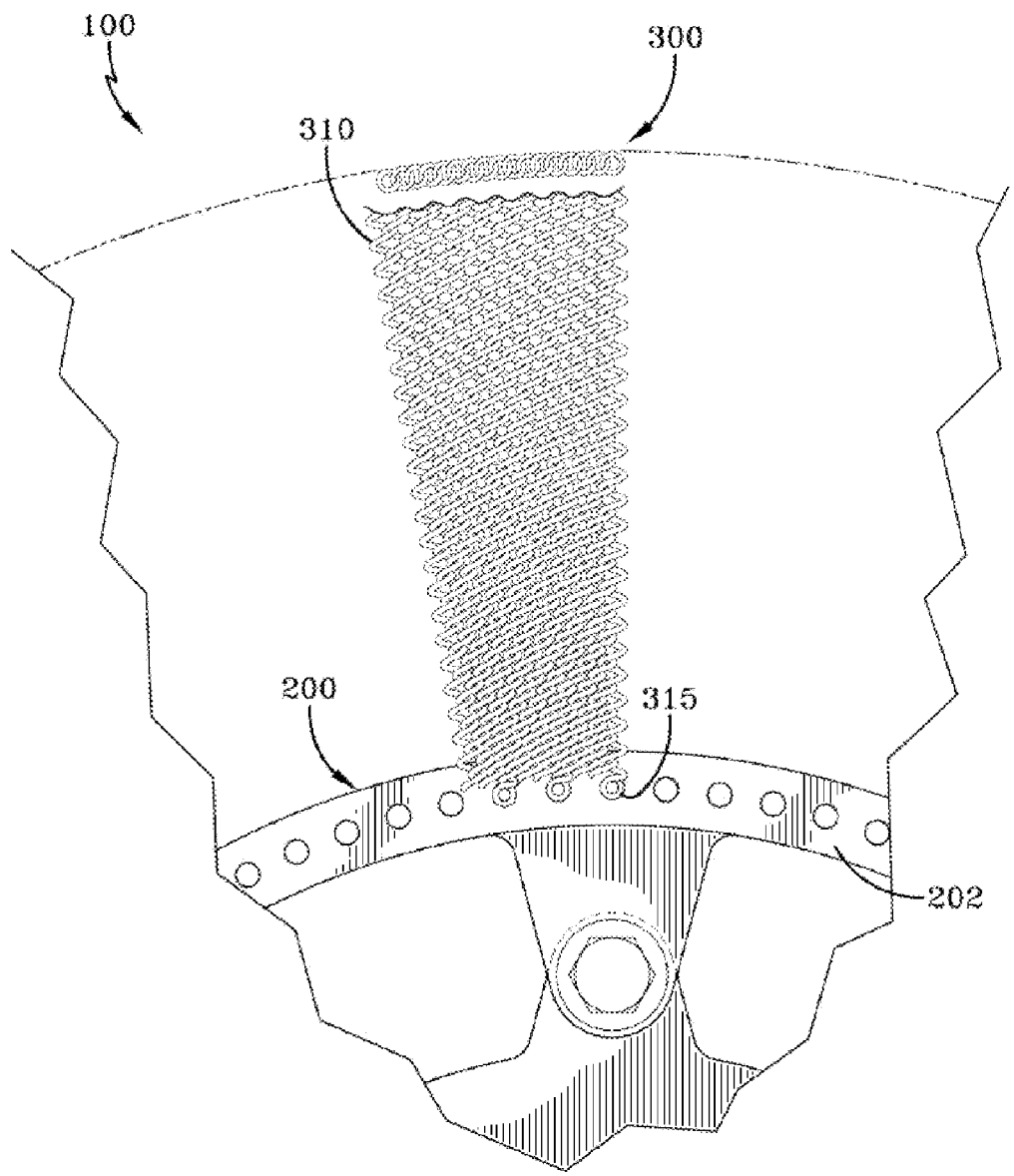
FIG. 10 represents a section taken through line 10-10 in FIG. 9.

As shown in FIGS. 8-10, an example assembly 100 in accordance with the present invention includes a wheel 200 and a tire 300. The wheel 200 has an annular rim 202 at each axial side for securing the tire 300 to the wheel. Each rim is fixed 202 relative to the other rim 202. Each rim 202 may include a plurality of socket holes 204 for aligning the tire 300 with the rim. Any other suitable means may be used for securing the tire 300 to the rim 200.

The tire 300 may include a plurality of helical springs 310 extending radially away from the wheel 200 in an arching configuration and radially back toward the wheel. Each end 315 of each spring 310 may be secured to wheel at a corresponding rim 202 of the wheel. Each spring 310 has a middle portion interconnecting the ends 315. Each end 315 may be secured at an axial orientation (FIG. 9) or at an angled orientation, with the spring 310 extending outward from one rim 202, then away from the wheel 300, then back over itself, then inward, and finally toward the other rim 202. Each end 315 of each spring may thereby be oriented coaxially (or at an angle) with the other end 315 of the same spring.

Further, each spring 55 may be interlaced with adjacent springs 55 (FIG. 2) enabling load sharing between springs. As shown in FIG. 2, each spring 55 is interlaced, or interwoven, with an adjacent spring 55 on a first side of the spring and further being interlaced with an adjacent spring 55 on a second opposite side of the spring. Thus, the springs 310 extend radially and axially and form a laced toroidal structure extending about an entire circumference of the tire 300 (FIGS. 8-10).

The helical springs 310 may be any suitable length, gauge, and pitch. The helical springs 310 may vary in coil diameter (i.e., barrel springs may be used) to create continuity in the mesh through the range of radial positions in the tire. The helical springs 310 may be further structured as two or more plies, (FIGS. 2 & 5), one or more radially inner plies being radially overlapped by one or more radially outer plies. The helical springs 310 may be Ti—N alloy, steel, titanium, polymer, ceramic, or any other suitable material.

In the foregoing description, certain terms have been used for brevity, clearness, and understanding; but no unnecessary limitations are to be implied therefrom beyond the requirement of the prior art, because such terms are used for descriptive purposes and are intended to be broadly construed. Moreover, the description and illustration of the present invention is by way of example, and the scope of the present invention is not limited to the exact details shown or described.

Having now described the features, discoveries, and principles of the present invention, the manner in which the present invention is constructed and used, the characteristics of the construction, and the advantageous, new, and useful results obtained, the scope of the new and useful structures, devices, elements, arrangements, parts, and combinations are hereby set forth in the appended claims.

The following is claimed:

1. An assembly having a wheel and a nonpneumatic tire, the nonpneumatic tire comprising a plurality of helical springs, each helical spring comprising:

a first end portion, a second end portion, and an arching middle portion, each helical spring being interlaced with at least one other helical spring thereby forming a laced toroidal structure extending about an entire circumference of the tire, the toroidal structure supporting an entire load placed on the nonpneumatic tire, the first end portions of a plurality of helical springs being directly secured to a first annular structure of the wheel and the second end portions of the plurality of helical springs being directly secured to a second annular structure of the wheel, the first end portion of each of the plurality of helical springs being oriented coaxially with the second end portion of each of the plurality of helical springs.

2. The assembly as set forth in claim 1 wherein the first and second annular structures are disposed at each axial side of the tire for securing the tire to the wheel.

3. The assembly as set forth in claim 1 wherein the toroidal structure defines a first ply for the tire.

4. The assembly as set forth in claim 3 further comprising a second ply, the second ply radially overlapping the first ply.

5. The assembly as set forth in claim 4 wherein the second ply comprises a second laced toroidal structure having a plurality of helical springs.

6. The assembly as set forth in claim 5 wherein each helical spring of the second ply comprises:

a first end portion, a second end portion, and an arching middle portion, each helical spring being interlaced with at least one other helical spring thereby forming the second laced toroidal structure extending about an entire circumference of the tire, the first end portions of a plurality of helical springs of the second ply being secured to the first annular structure and the second end portions of the plurality of helical springs of the second ply being secured to the second annular structure.

7. The assembly as set forth in claim 1 wherein the first and second annular structures each include a plurality of socket holes for aligning the nonpneumatic tire with the first and second annular structures.

8. An assembly having a wheel and a nonpneumatic tire, the nonpneumatic tire comprising a plurality of springs, each spring comprising:

a first end portion, a second end portion, and an arching middle portion interconnecting the first end portion and the second end portion, each spring extending radially outward from the first end portion to the middle portion and radially inward from the middle portion to the second end portion, each spring being interwoven with an adjacent spring on a first side of the spring and further being interwoven with an adjacent spring on a second opposite side of the spring thereby forming a toroidal structure extending about an entire circumference of the nonpneumatic tire, the toroidal structure supporting an entire load placed on the nonpneumatic tire, the first end portions of a plurality of helical springs being directly secured to a first annular structure of the wheel and the second end portions of the plurality of helical springs being directly secured to a second annular structure of the wheel, the first end portion of each of the plurality of helical springs being oriented coaxially with the second end portion of each of the plurality of helical springs.

9. The assembly as set forth in claim 8 wherein each spring forms an arch extending radially outward from a wheel.

10. The assembly as set forth in claim 8 wherein the first and second annular structures are disposed at each axial side of the tire for securing the springs to the wheel.

11. The assembly as set forth in claim 8 wherein the toroidal structure defines a first ply for the tire.

12. The assembly as set forth in claim 11 further comprising a second ply, the second ply radially overlapping the first ply.

13. The assembly as set forth in claim 12 wherein the second ply comprises a second toroidal structure having a plurality of springs.

14. The assembly as set forth in claim 13 wherein each spring of the second ply comprises:
- a first end portion, a second end portion, and an arching middle portion interconnecting the first end portion and the second end portion, each spring of the second ply extending radially outward from the first end portion to the middle portion and radially inward from the middle portion to the second end portion,
- each spring of the second ply being interwoven with an adjacent spring on a first side of the spring and further being interwoven with an adjacent spring on a second opposite side of the spring thereby forming the second toroidal structure extending about an entire circumference of the tire,
- the first end portions of a plurality of helical springs of the second ply being secured to the first annular structure and the second end portions of the plurality of helical springs of the second ply being secured to a the second annular structure.

15. The assembly as set forth in claim 8 wherein the first and second annular structures each include a plurality of socket holes for aligning the nonpneumatic tire with the first and second annular structures.

* * * * *